United States Patent
Chaula et al.

(10) Patent No.: US 12,254,492 B2
(45) Date of Patent: Mar. 18, 2025

(54) LOCAL CONTENT EXCHANGE FOR MOBILE DEVICES VIA MEDIATED INTER-APPLICATION COMMUNICATION

(71) Applicant: YAHOO AD TECH LLC, Dulles, VA (US)

(72) Inventors: Gaurav Chaula, New Delhi (IN); Kavind Aggarwal, Hyderabad (IN)

(73) Assignee: YAHOO AD TECH LLC, New York, NY (US)

( * ) Notice: Subject to any disclaimer, the term of this patent is extended or adjusted under 35 U.S.C. 154(b) by 0 days.

(21) Appl. No.: 17/693,699

(22) Filed: Mar. 14, 2022

(65) Prior Publication Data
US 2022/0198520 A1     Jun. 23, 2022

Related U.S. Application Data

(63) Continuation of application No. 16/202,791, filed on Nov. 28, 2018, now Pat. No. 11,276,083.

(51) Int. Cl.
| | |
|---|---|
| *G06Q 30/0251* | (2023.01) |
| *G06Q 30/0601* | (2023.01) |
| *H04L 67/55* | (2022.01) |
| *H04L 67/565* | (2022.01) |
| *H04L 67/568* | (2022.01) |
| *H04W 4/12* | (2009.01) |

(52) U.S. Cl.
CPC ..... *G06Q 30/0267* (2013.01); *G06Q 30/0641* (2013.01); *H04L 67/55* (2022.05); *H04L 67/565* (2022.05); *H04L 67/568* (2022.05); *H04W 4/12* (2013.01)

(58) Field of Classification Search
CPC ............ G06Q 30/0267; G06Q 30/0641; H04L 67/55; H04L 67/565; H04L 67/568; H04W 4/12
USPC .......................... 705/14.64, 14.49; 709/203
See application file for complete search history.

(56) References Cited

U.S. PATENT DOCUMENTS

| | | | |
|---|---|---|---|
| 2009/0024698 A1* | 1/2009 | Ho | G06F 16/9577 709/203 |
| 2015/0012354 A1* | 1/2015 | Pedersen | G06Q 30/0251 705/14.49 |
| 2016/0344679 A1* | 11/2016 | Lane | G06Q 10/101 |
| 2016/0350810 A1* | 12/2016 | Smirnov | H04M 1/72403 |
| 2017/0308518 A1* | 10/2017 | Sjolander | G06F 40/186 |

OTHER PUBLICATIONS

Neil Patel, The Complete Guide to Website Push Notifications for E-commerce, 2018 (Year: 2018).*

* cited by examiner

*Primary Examiner* — Tarek Elchanti
(74) *Attorney, Agent, or Firm* — James J. DeCarlo; Greenberg Traurig, LLP (57) ABSTRACT

Disclosed are methods and devices for converting mobile notifications to content using a local content exchange. In one embodiment, the method comprises receiving a request for content from a mobile application; querying a data store of available content, the data store of available content populated with one or more notifications received by other mobile applications installed on the mobile device; identifying a responsive notification for the request for content based on the querying, the content item identified based on bid parameters associated with the one or more notifications; and transmitting the responsive notification to the mobile application.

14 Claims, 8 Drawing Sheets

LOCAL CONTENT EXCHANGE FOR MOBILE DEVICES VIA MEDIATED INTER-APPLICATION COMMUNICATION

CROSS-REFERENCE TO RELATED APPLICATIONS

This application is a continuation of, and claims the benefit of, U.S. patent application Ser. No. 16/202,791, filed Nov. 28, 2018 which is incorporated by reference in its entirety.

COPYRIGHT NOTICE

This application includes material that is subject to copyright protection. The copyright owner has no objection to the facsimile reproduction by anyone of the patent disclosure, as it appears in the Patent and Trademark Office files or records, but otherwise reserves all copyright rights whatsoever.

BACKGROUND

The disclosed embodiments are directed toward the field of mobile device applications, and in particular to systems, methods, and apparatuses for enabling inter-application content exchange between applications.

Mobile devices such as smartphones enable access to content in nearly any location at any time. The form factor and use of applications ("apps") provides a nearly continuous outlet for content to be delivered to users. While this ubiquity allows for constant user attention, the limited storage capacity of mobile devices requires that these devices be "network-enabled" to provide an optimal experience.

Currently, many apps utilize a network to provide some or all the content displayed within the apps. These apps may retrieve "fresh" data from centralized content servers (e.g., in the scenario of a "news" application), thus providing a continuously updated display without requiring re-compiling of the app. Apps additionally utilize "push notifications" wherein a central server pushes content to all installations of a given app, the content comprising short informational or actionable text, images, and other content. Push notifications allow app developers to inform users regarding the app without requiring the user to continuously monitor the app. Finally, some apps provide in-app advertising to compensate the developers, most notably when the app is provided at no charge to users. These apps include additional code compiled in the app which communicates with a networked advertising server to retrieve content relevant to a given user.

While there are multiple ways to network mobile apps, the current state of the art is behind the rapid adoption of mobile devices. For instance, in-app advertising is currently experiencing a shortage of content (i.e., digital advertisements) to fill the exponentially growing number of devices (and thus "ad slots"). Frequently, when a user launches an app and an advertisement is requested from an ad server, there are no suitable advertisements matching the request. Thus, the ad slot in the app is unfulfilled or displays irrelevant content. Additionally, the misuse or overuse of push notifications has resulted in users blindly dismissing such notifications, thus frustrating the fundamental purpose of push notifications.

Additionally, there are many other deficiencies in the current frameworks for embedding in-app advertising within mobile app codebases. Most notably, in-app advertising frameworks require a network connection. Since the digital advertisements are managed by an ad exchange, it follows that apps must be able to communicate with these ad servers to request content. However, users can control the amount of access an app has to a network. For example, cellular data can be disabled on a per-app basis. In this scenario, a user can effectively "disable" in-app advertising.

Finally, the current state of the art cannot effectively target users with highly specific content. Generally, ad exchanges are capable of tracking and targeting users using demographic data collected based on the user's network interactions (e.g., a user's age range, location, etc.). However, these systems do not have access to various mobile data points relevant to targeting on mobile platforms. For instance, a mobile app store (often, the manufacturer of the mobile device) may record a list of the user's installed applications but this data is not available to any other systems beyond the app store systems.

As will be described in more detail, the technical solutions embodied in the specification and claims remedy these (and other) technical problems existing in the current state of mobile applications.

SUMMARY

To remedy these, and other, problems, the disclosed embodiments describe a separate device-side content exchange platform that mediates content exchanges between applications using inter-application communication. Generally, the embodiments are described in the context of mobile applications but may equally be applied to other platforms.

In brief, a device-side content exchange is installed within a mobile device. This exchange may be part of the operating system or may be installed as a separate standalone application. Mobile applications using the device-side content exchange may compile the applications with a library for interacting with the exchange. Further, existing ad slots may be re-configured to utilize the device-side content exchange versus server-side exchanges.

The device-side content exchange receives requests for content from applications via the library. In one embodiment, these requests are triggered based on a user viewing the mobile app and the displayed screen including an ad slot or other location where content may be displayed. The device-side content exchange caches a listing of notifications associated with other apps installed on the user's device. In some embodiments, these notifications may be intercepted when they are pushed to the mobile device. Alternatively, apps can transmit the notifications directly to the device-side content exchange by the respective apps.

The device-side content exchange periodically synchronizes with a front-end server. This server stores the advertisement campaigns corresponding to a given app and records data such as bid prices, campaign lengths, etc. The device-side content exchange periodically transmits information regarding the number of opportunities, impressions, and other operational data regarding the device-side content exchange.

The device-side content exchange uses the cached notifications and synced campaign information to select the notification with the highest bid and the device-side content exchange returns this notification to the app initiating the request. In response, the initiating app can display the notification in the content slot. The device-side content exchange can additionally confirm that the notification was displayed and update the number of impressions for a given notification and app. This impression data is then synced with the front-server for reporting, billing, etc.

As briefly discussed above, the disclosed embodiments provide a radically different architecture for providing supplemental content to apps. All existing systems for presenting supplemental content generally rely on a server-side repository of content (e.g., advertisements) and a server-side "exchange" for mediating between sellers (e.g., apps or webpages) and buyers (e.g., advertisers). This traditional architecture was ported to mobile devices but failed to leverage the unique aspects of mobile devices. In contrast to Web-based advertising, mobile devices may operate "offline" and store significant amounts of useful data that a user may be interested in.

The disclosed embodiments leverage these aspects to provide a client-side content exchange on mobile devices that is strongly decoupled from a server-side platform. Indeed, the server-side platform is only required to be synchronized periodically. Thus, the device-side content exchange is fully capable of functioning offline, a feature that was impossible with existing content exchanges. Further, the device-side content exchange enables highly targeted content since mobile applications can communicate directly with the app requesting content. Thus, notifications displayed in ad slots are no longer limited to generic content but rather can include highly specific content (e.g., content related to the status of content within another app).

DETAILED DESCRIPTION

Subject matter will now be described with reference to the accompanying drawings which show illustrative embodiments. Subject matter can, however, be embodied in a variety of different forms and the claimed subject matter is intended to be construed as not being limited to any example embodiments. Likewise, a reasonably broad scope for claimed or covered subject matter is intended. Among other things, subject matter can be embodied as methods, devices, components, or systems. Accordingly, embodiments can, for example, take the form of hardware, software, firmware or any combination thereof (other than software per se).

The present disclosure is described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to: a processor of a general-purpose computer to alter its base functions as detailed herein; a special purpose computer; ASIC or other programmable data processing apparatus, such that the instructions when executed implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

In general, terminology can be understood at least in part from usage in context. For example, terms, such as "and", "or", or "and/or," as used herein can include a variety of meanings that can depend at least in part upon the context in which such terms are used. Typically, "or," if used to associate a list, such as A, B or C, is intended to mean A, B, and C, here used in the inclusive sense, as well as A, B or C, here used in the exclusive sense. Also, the term "one or more" as used herein, depending at least in part upon context, can be used to describe any feature, structure, or characteristic in a singular sense or can be used to describe combinations of features, structures or characteristics in a plural sense. Similarly, terms, such as "a," "an," or "the," again, can be understood to convey a singular usage or to convey a plural usage, depending at least in part upon context. Also, the term "based on" can be understood as not necessarily intended to convey an exclusive set of factors and can, instead, allow for the existence of additional factors not necessarily expressly described, again, depending at least in part on context.

Figure 1:
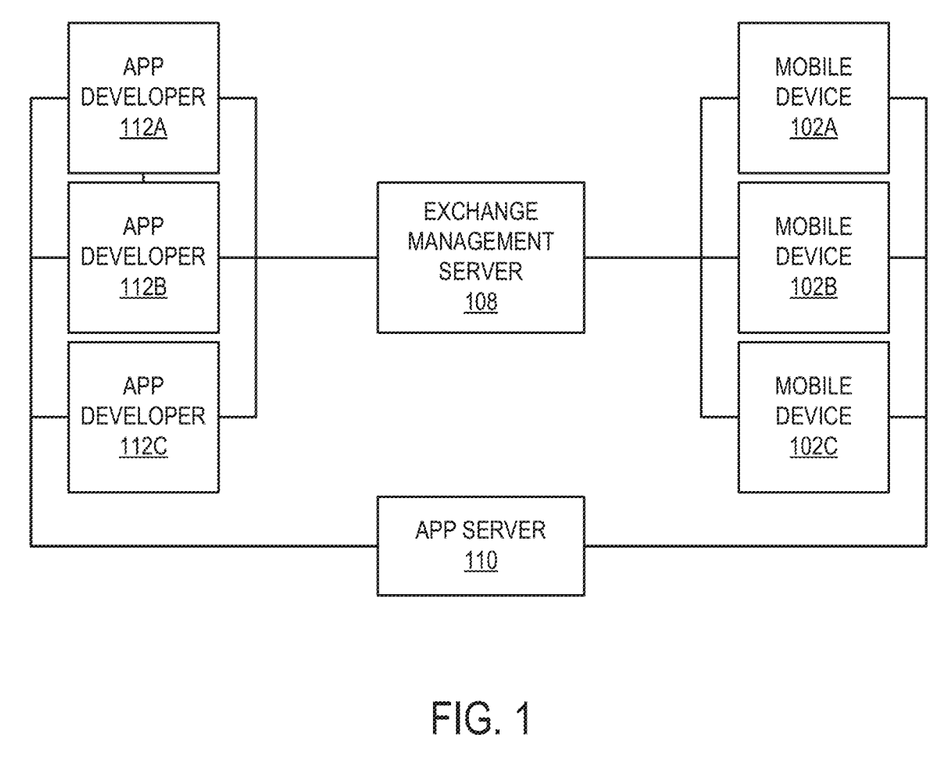
FIG. 1 is a block diagram illustrating a system for providing a local content exchange.

FIG. 1 is a block diagram illustrating a system for providing a local content exchange.

In the illustrated embodiment, mobile devices (102A-102C) are communicatively coupled to app developers (112A-112C) via an exchange management server (108) and an app server (110).

Figure 4:
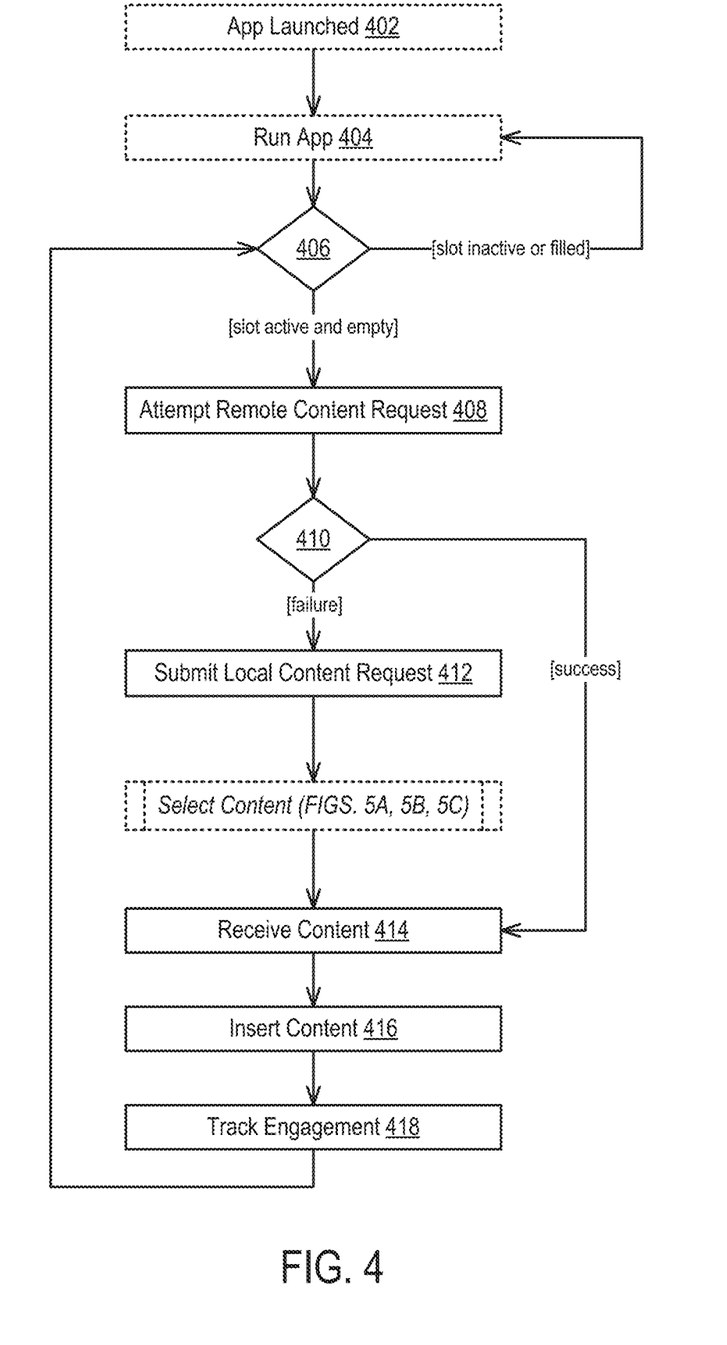
FIG. 4 is a flow diagram illustrating a method for displaying locally exchanged content according to some embodiments of the disclosure.
Figure 6:
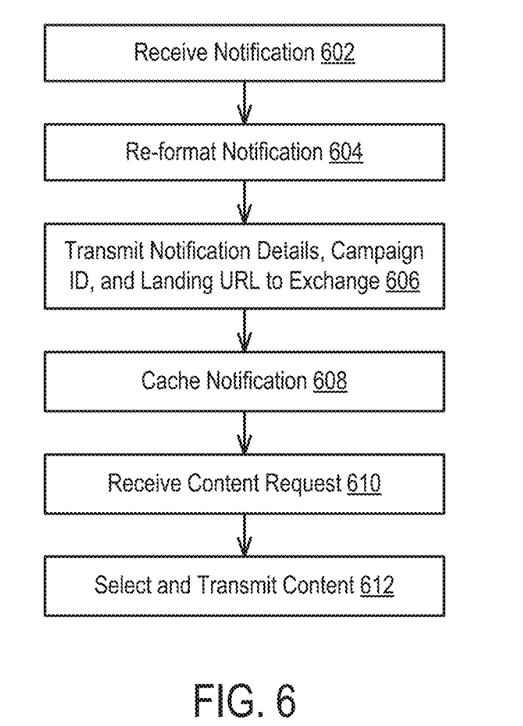
FIG. 6 is a flow diagram illustrating a method for generating locally exchanged content from push notifications according to some embodiments of the disclosure.

Each of the mobile devices (102A-102C) can include a configuration to perform at least one of the operations described herein, such as the local device exchange operations performed in FIGS. 4 and 6. A mobile device can be configured to send and receive signals such as through a wired transmission media or a wireless transmission media. In one embodiment, mobile devices (102A-102C) comprise any device small enough to be held and operated by one or two hands of a person. In some examples, a mobile device has a touchscreen interface with digitally derived buttons and keyboard or physical buttons along with a physical keyboard or keypad. A mobile device can connect to the Internet and interconnect with other devices such as an IoT device or another type of network connected device via Wi-Fi, Bluetooth, cellular networks or near field communication (NFC). Power can be provided to a mobile device by a battery or other wireless power source such a solar power source.

Although FIG. 1 illustrates mobile devices (102A-102C) and as single computing devices, respectively, the disclosure is not so limited. For example, one or more functions of a mobile device can be distributed across one or more distinct computing devices. Moreover, in one embodiment, multiple mobile devices can be integrated into a single computing device, without departing from the scope of the present disclosure.

In the illustrated embodiment, app developers (112A-112C) may comprise a computing device or, more commonly, a network of computing devices used to create, manage, or otherwise interact with applications (e.g., mobile apps) provided by the app developers (112A-112C) to mobile devices (102A-102C).

In one embodiment, app developers (112A-112C) upload apps to the app server (110) for distribution to mobile devices (102A-102C). In one embodiment, app server (110) comprises a third-party server (or set of servers) that provides a mobile app store or other distribution channel. In one embodiment, app server (110) coordinates the review and packaging of mobile apps from app developers (112A-112C). For example, the app server (110) can receive source code from app developers (112A-112C), review the source code for app store compliance, and compile the applications prior to delivery to mobile devices (102B). Examples of app servers include servers implementing stores such as the Google® Play Store or Apple® App Store.

App developers (112A-112C) additionally communicate with exchange management server (108). In one embodiment, exchange management server (108) is operated by an entity separate from the entity operating the app server (110). In some embodiments, they can be operated by the same entity.

Exchange management server (108) coordinates content delivery executed on mobile devices (102B). In one embodiment, server (108) may comprise one more servers and databases storing details regarding developers (112A-C), applications delivered by developers (112A-112C) to mobile devices (102A-102C), as well as content delivery settings. In one embodiment, server (108) is configured to generate reports regarding content delivery executed on mobile devices (102A-102C). In one embodiment, server (108) includes content delivery campaigns generated by developers (112A-112C), budgets, and other parameters governing how content should be distributed on mobile devices (102A-102C).

While server (108) centrally stores the above information, it periodically syncs information with mobile devices (102A-102C). No limit is placed on how frequently or infrequently the server (108) syncs with the mobile devices (102A-102C). In the illustrated embodiment, the server (108) syncs available developers, campaigns, and other settings at a predefined interval. Conversely, mobile devices (102A-102C) periodically sync data recorded on the mobile devices such as the number of times content is exchanged on the mobile devices, interactions with that content, and other parameters described herein.

Figure 2:
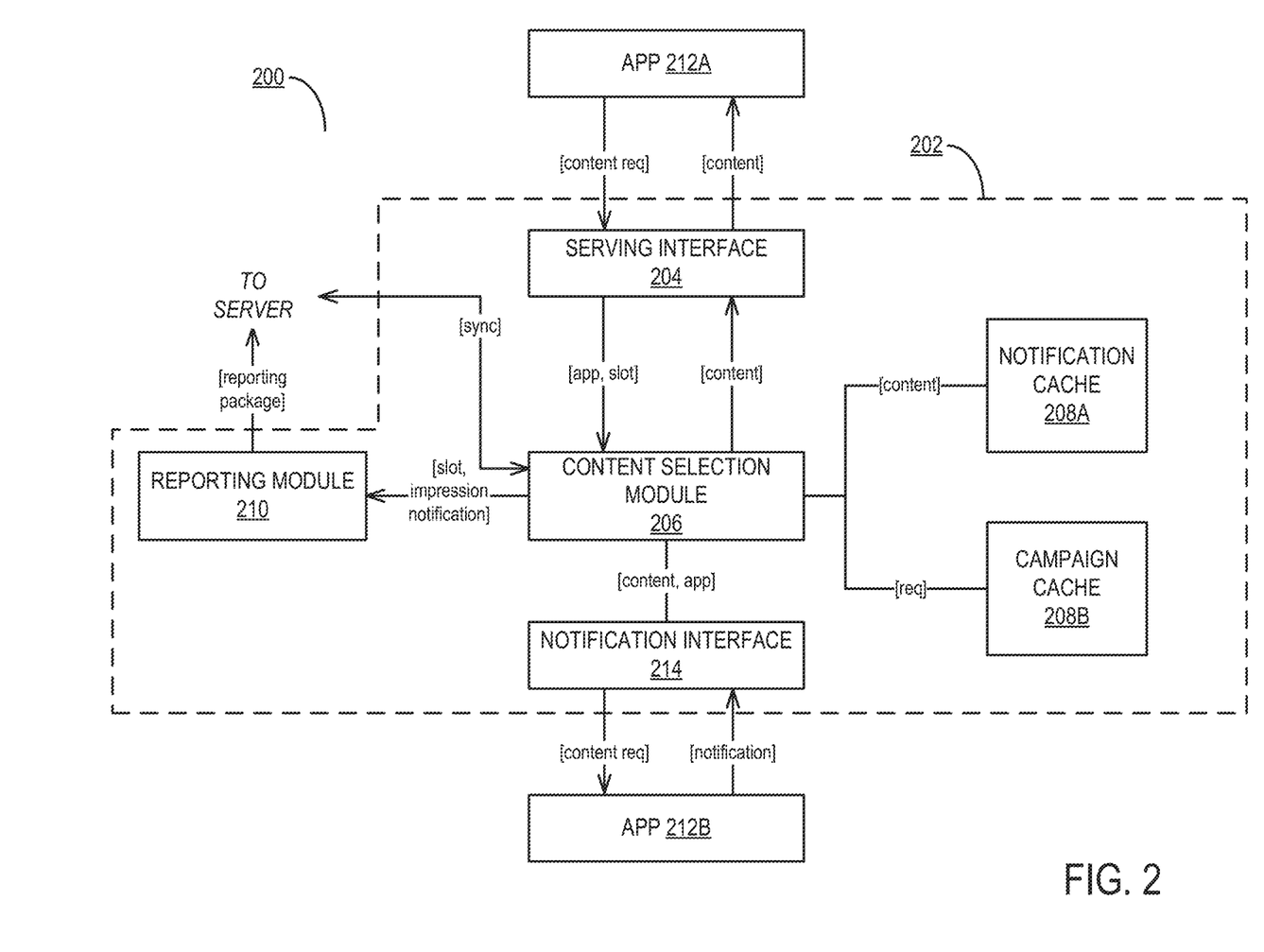
FIG. 2 is a functional block diagram of a mobile computing device implementing a local content exchange according to one embodiment of the disclosure.

FIG. 2 is a functional block diagram of a mobile computing device implementing a local content exchange according to one embodiment of the disclosure.

In the illustrated embodiment, a mobile device (200) includes a plurality of mobile applications (apps) (212A, 212B) and a local content exchange (202). In one embodiment, the exchange (202) is implemented as part of the operating system of the mobile device (200). In other embodiments, the exchange (202) is implemented as a standalone application executing on the mobile device (200). In the illustrated embodiment, apps (212A, 212B) comprise any type of application capable of being installed on a mobile device. In one embodiment, apps (212A, 212B) comprise both system-installed applications as well as user-installed application (e.g., applications downloaded over-the-air and installed In either scenario, the exchange (202) interacts with apps (212A, 212B) via serving interface (204) and notification interface (214). These interfaces may comprise interfaces exposed by the operating system of the device (200) or by a dynamically linked library installed along with the apps (212A, 212B).

In the illustrated embodiment, app (212A) issues content requests to the content selection process (206) via the serving interface (204). The app (212A) issues these requests in response to detecting that a slot for content is displayed by the app (212A) and is currently empty. Details regarding the requests for content are described more fully in the description of FIG. 4, the details of which are incorporated herein by reference in their entirety.

The serving interface (204) extracts an application identifier and slot details and transmits this information to the content selection module (206). The content selection module (206) may comprise an operating system module or a separate installed user application. The content selection module (206) is configured to match slots received from app (212A) to content provided by app (212B). Once the content selection module (206) selects the appropriate content, it returns the content to app (212A) via the serving interface (204). The content selection module (206) is additionally configured to store and manage campaign data and notification data in caches (208B and 208A, respectively). These caches (208A, 208B) may comprise persistent storage systems controlled by the content selection module (206) such as local databases, flat files, etc. The content selection module (206) is additionally configured to periodically synchronize with a remote server. Specifically, the content selection module (206) is configured to retrieve listings of applications registered with the server and installed on the user device, campaigns for those applications, bid functions or parameters, and other metrics described herein. Finally, the content selection module (206) is additionally configured to transmit reporting metrics (e.g., impressions, slot identifiers, application identifiers, notification identifiers, etc.) to a reporting module (210). The reporting module (210) packages the received information and periodically syncs a reporting package (e.g., a daily, weekly, monthly report) containing aggregated and, in some cases, pseudo-anonymized, usage data back to the remote server. These and other details of the content selection module (206), caches (208A, 208B) and reporting module (210) are described more fully in the description of FIGS. 5A-5C, 6, and 7, the details of which are incorporated herein by reference in their entirety.

The mobile device (200) additionally includes app (212B). In the illustrated embodiment, app (212B) comprises a content-generating application. In the illustrated embodiment, the app (212B) transmits notifications to a notification interface (214). In one embodiment, the notification interface (214) receives notifications and re-formats the notification as content to be distributed to app (212A). Notification interface (214) is also configured to transmit content requests to app (212B) which causes the app (212B) to transmit notifications to content selection module (206) for subsequent delivery. Details of the app (212B), notification interface (214) and the content selection module (206) are described in FIG. 6, the disclosure of which is incorporated herein by reference in its entirety.

Figure 3A:
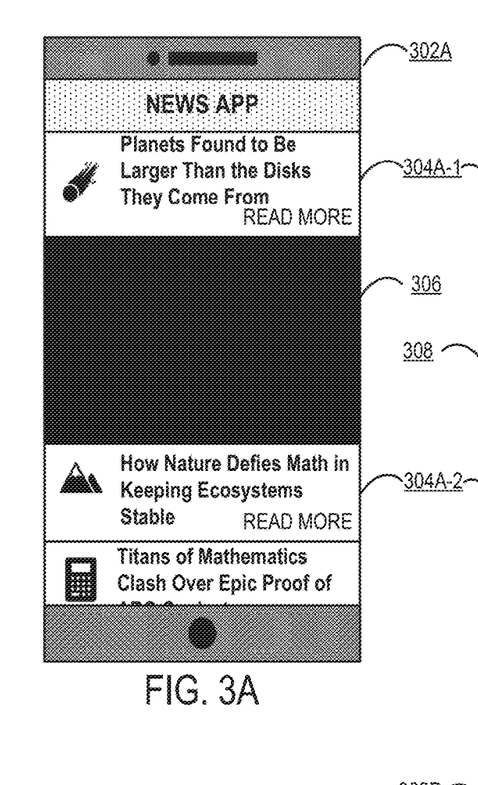
FIGS. 3A, 3B, and 3C are user interface diagrams of a mobile application executing on a mobile device according to some embodiments of the disclosure.
Figure 3B:
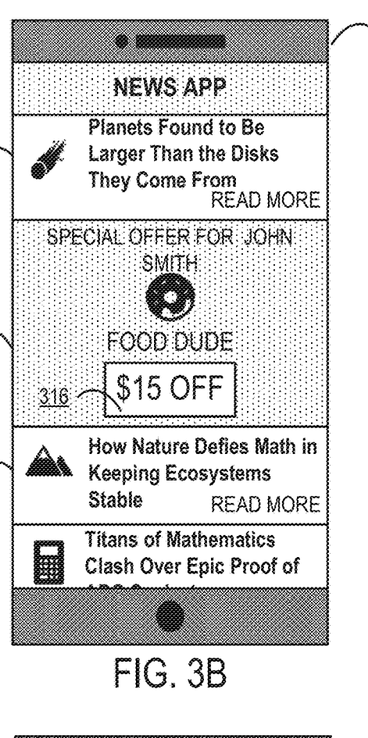
Figure 3C:
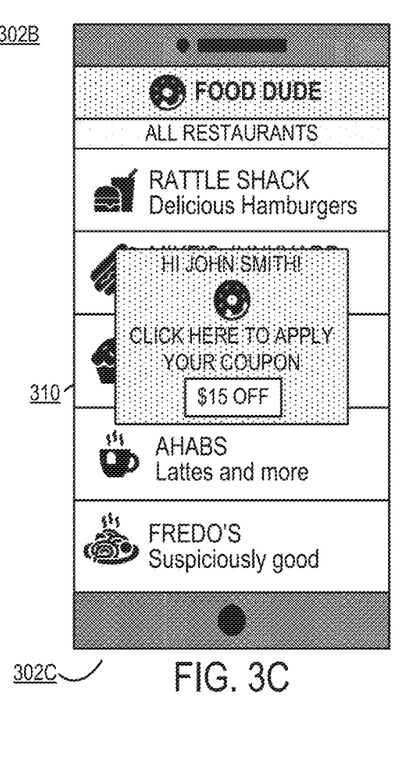

FIGS. 3A, 3B, and 3C are user interface diagrams of a mobile application executing on a mobile device according to some embodiments of the disclosure.

FIG. 3A illustrates a first screen (302A) of a mobile application, such as app (212A). In the illustrated embodiment, the screen (302A) displays a plurality of items (304A-1, 304A-2) and the specific content and arrangement of these items is not limited. Embedded within the listing of items (304A-1, 304A-2) is a slot (306). In the illustrated embodiment, the slot (306) is represented as a darkened area but may appear as "empty" space in the screen (302A).

FIG. 3B illustrates a second screen (302B). In the illustrated embodiment, the second screen (302B) is generated after content for slot (306) has been identified and retrieved by the application. As illustrated, the slot (306) has been filed with content (308).

As illustrated, content (308) comprises content personalized for the user of the device. This content is generated by a developer of another app installed on the device (such as the app illustrated in FIG. 3C). Since the app generating the content is locally installed, it has access to personal information and metrics not capable of being captured by remote systems. For example, current systems restrict the transmission of personal information within push notifications due to potential security risks involved in the transmission of personal or confidential information over potentially insecure networks. Further, the storage of personal information on a remote server poses numerous risks such as data theft, exposure, etc. A user storing his or her personal data on a local device poses none of these risks. However, when a user stores their own data on their own device, there is no way to utilize the data for content selection and delivery. Thus, previous content selection and delivery algorithms were limited to broad demographic-based targeting and could not deliver content specific to a user and specific to the application installed on their device. The methods and systems describe below clearly describe a technical solution to this problem while FIGS. 3A-3D illustrate, graphically, the physical manifestation of the solution.

FIG. 3C illustrates a third screen (302C) of a content-providing app. As illustrated, the screen (302C) represents a "Food Dude" application which corresponds to the content inserted in screen (302B). In one embodiment, the content (308) includes a button or touchable object (316) that hyperlinks directly to screen (302C). This hyperlink may include details of the content such as the discount amount ($15) which is then used to generate an in-app message (310) notifying the user of the acceptance of the coupon.

Figure 3D:
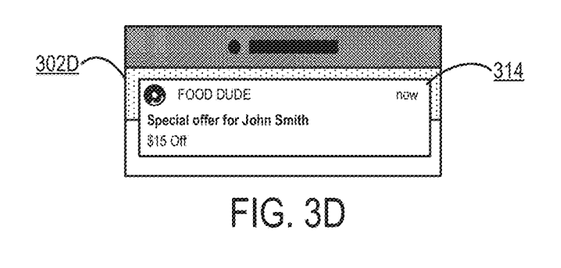
FIG. 3D is a user interface diagram of a traditional mobile notification display on a mobile device according to some embodiments of the disclosure.

By way of comparison, FIG. 3D illustrates a traditional mobile notification (314) display on a partial screen (302D). Notably, this notification (314) corresponds to the same underlying data displayed in content (308). As will be discussed, the notification (314) may be "reformatted" into content (308) before being inserted into an app. Thus, the illustrated embodiments allow for re-using existing mobile notifications to generated exchanged content.

FIG. 4 is a flow diagram illustrating a method for displaying locally exchanged content according to some embodiments of the disclosure.

In step 402, the method launches an application. In one embodiment, the application comprises a mobile application executing on a mobile device. In one embodiment, the method launches an application in response to a user interaction (e.g., manually opening an app, following a hyperlink to the app, etc.).

In step 404, the method runs the application. In the illustrated embodiment, running the application may comprise executing one or more executables comprising the application. In the illustrated embodiment, steps 402 and 404 are optional and may be performed independently of the remaining steps.

In step 406, the method continuously checks whether a content slot is active and empty. If a slot is inactive or is filled the method continues to run the application (404) as usual. If a slot is detected, and is empty, the method attempts to fill the slot with content (steps 408-418).

As described in FIGS. 3A-3C, applications generally display content. For example, news readers may display headlines of stories which link to full articles. Within these applications, one or more "slots" can be configured at various locations in the application. A slot comprises a dynamically filled portion of the user interface that is filled with content external to the application. One example of a slot is an inline slot wherein external content is inserted within the "flow" of an applications content. An inline slot is depicted in FIGS. 3A-3B. Another type of slot is a persistent banner slot. This type of slot occupied a fixed location of the screen for a predefined duration of the application. For example, a 25-pixel region at the bottom of the screen may be designated as a persistent banner slot and content may be inserted into that slot as requested. Another type of slot is a full screen interstitial slot. This type of slot comprises a full-screen rendering of external content that blocks the user from interacting with the application itself while it is displayed.

The specific types of slot are not intended to limit the disclosure, and indeed any type of arrangement of slots may be used (independently or combined with one another). In general, a slot refers to any portion of a mobile application capable of displaying content such as third-party or external content (e.g., advertising or sponsored content).

To create slots in an app, a developer of the app must modify the code of the app to include the slot. Generally, a developer identifies a section of one or more screens of the app in which a slot should be included and includes code to define the slot. This code is a combination of template code provided by the entity managing the content exchange as well as developer-specific code (e.g., advertising unit identifiers) that allow for the targeted delivery of content.

For example, the following pseudocode illustrates how banner advertisements may be programmatically inserted into an existing app codebase:

```
import Banner from ExchangeLibrary;
class ViewController {
    const slot = Banner(space: "bottom");
    func viewDidAppear( ){
        super.viewDidAppear( );
        slot.fetchAndDisplayContent(self.view);
    }
}
```

Here, the banner slot is added to the app screen managed by the ViewController class. When the viewDidAppear code is run upon displaying the screen, the content for the slot is fetched and then displayed in a pre-defined content slot which comprises a fixed size slot at the bottom of the screen.

In one embodiment, and as illustrated in the above code listing, slots can be configured on a per-view basis. That is, each screen or view of the application can define one or more slots. In one embodiment, the comparison performed in step 406 can be performed as part of the loading of the screen. That is, upon loading a screen, a callback code is executed to trigger the remaining content fulfillment procedure (steps 408-418).

In another embodiment, as illustrated in FIGS. 3A-3B, slots may be configured as part of a scrollable or otherwise changeable portion of a screen. For example, if the screen displays a table view of content, a slot can be configured to be inserted into an initially offscreen portion. In this embodiment, the method (in step 406) idles until the slot is detected as being in view (e.g., "active").

Finally, the method (in step 406) also confirms that the slot is not filled. In some embodiments, this sub-step may be skipped if the slot is only checked once (e.g., when a screen is rendered). However, in some embodiments, the slot is movable and thus the code determining whether to fill the slot will be executed multiple times for a given screen. Thus, to avoid unnecessary calls for content, the method performs a gating check to ensure that the slot is empty before proceeding.

In some embodiments (not illustrated), the method may perform step 406 periodically to "refresh" content. In these embodiments, the method would additionally check to determine if a refresh timer has expired. If the time has expired, the method would forcefully replace the content in the slot despite the slot being active but not empty.

In step 408 of the illustrated embodiment, the method first attempts to retrieve remote content. In one embodiment, step 408 may be optional as described herein.

In the illustrated embodiment, a slot may be filled with remote content using traditional means. For example, an ad slot may be filled with content served by a remote content exchange. In this embodiment, the method issues a network request to a remote serve with an identifier of the application and receives, as a response, content to display within the slot.

In step 410, the method checks to see if the content request is successful. A content request is successful if the remote server returns content to be displayed within the application. The method may confirm this by analyzing the status code of a response and/or analyzing the body of the response. If the response is successful, the method receives the content in step 414 (discussed infra).

During the remote content request, various errors may occur. For example, if the application is not connected to a network, the request will not be able to be sent, resulting in a null response. Alternatively, if the request is successful, the request may not return a response within a predefined time interval (e.g., the time in which the slot is displayed) due to network congestion. Additionally, the response may not return content to display if there is no suitable content to meet the request. These and other problems result in a slot going unfulfilled which is in direct contradiction to the purpose of including the aforementioned code in an application.

The method detects these errors in step 410. Upon detecting a failure of a remote request (if step 408 is implemented), the method submits a local content request (step 412).

As described previously, the submission of a local content request may be performed by calling a suitable method provided by a local content exchange library. The library may be installed as part of the operating system or may comprise a dynamically linked library included within the application itself.

Below is a pseudo code listing of one embodiment of a library for submitting a content request either locally or remotely.

```
class Banner {
  func fetchAndDisplayContent(view){
    const response;
    try {
      response = http.get(CONTENT_URL, CONTENT_PARAMS);
      if (response.empty? || response.hasError?) {
        response = LocalExchange.get(CONTENT_PARAMS);
      }
    } catch {
      response = LocalExchange.get(CONTENT_PARAMS);
    }
    view.renderPartial(response)
  }
}
```

The above code may be implemented by a library included within an application. The fetchAndDisplayContent function (discussed previously) first attempts to issue a Hypertext Transfer Protocol (HTTP) request to retrieved content from a specific uniform resource locator (URL) with a set of parameters. If the response fails, the response is empty, or the response causes an error, the code then issues a request to the LocalExchange object to retrieve local content using the same parameters. In one embodiment, the LocalExchange object can be included as part of the library implementing the fetchAndDisplayContent function or may comprise an operating system library exposed via one or more interfaces.

The operation of the local exchange is described more fully in the description that follows and is not repeated herein. In general, the local exchange manages content received from other applications and responds to requests with this managed content.

In response to the local content request (412), the method receives the content in step 414. In one embodiment, the content comprises an item of content created by another app developer. In one embodiment, the other app developer comprises the developer of another application installed on the same device as the device launching the app in step 402. In one embodiment, app developers push notifications to apps which are then reformatted as content for slots, as described in more detail herein.

After receiving the content, the method then inserts the content into a slot in step 416. As described above, inserting the content into a slot may comprise inserting the content into a banner slot, interstitial slot, or other type of slot according to parameters of the content.

Finally, the method tracks engagement of the content after it is inserted in step 418. In one embodiment, a given item of content may be hyperlinked to an application, a website, or other location. In one embodiment, the method is configured to monitor if a user selects the content and navigates to the identified location. Alternatively, or in conjunction with the foregoing, the method may monitor the number of impressions of the content on the device.

In one embodiment, step 418 comprises periodically, or in real-time, transmitting engagement data from the application to the local content exchange. In one embodiment, the transmission of engagement data to the local content exchange results in finer grained engagement data being collected since the method is not required to incur the overhead of transmitting network requests containing engagement data.

Figure 5A:
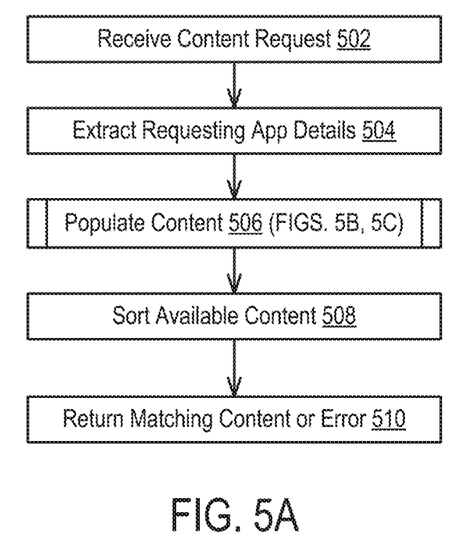
FIG. 5A is a flow diagram illustrating a method for exchanging local content according to some embodiments of the disclosure.

FIG. 5A is a flow diagram illustrating a method for exchanging local content according to some embodiments of the disclosure. In one embodiment, the method illustrated in FIG. 5A is performed by a local content exchange, as described previously.

In step 502, the method receives a content request. The content request comprises a request for content to insert into a slot available within an application, as described previously.

In step 504, the method extracts details of the requesting application.

In one embodiment, the content request includes various data points regarding the request. In one embodiment, the request includes a slot identifier which uniquely identifies the slot within the app. In some embodiments, the request includes an application identifier that uniquely identifies the application itself. In one embodiment, the request also includes parameters describing the type of content requested. For example, the request may include one or more flags blocking different types of content (e.g., offensive, adult, etc.). In some embodiments, the request includes details regarding the slot such as a slot type (e.g., banner, interstitial, etc.). Each of these parameters can be used to identify the appropriate content to return to the requesting application, as will be described in more detail below.

In step 506, content responsive to the request is populated. Details regarding the operation of step 506 are described in more detail in the description of FIGS. 5B and 5C, the disclosure of which is incorporated herein by reference in its entirety.

In step 508, the method sorts the available content.

In one embodiment, the method sorts the available content based on a bid price associated with the content. In this embodiment, each item of content (and correspondingly, mobile application) places one or more bids on slots available for content. In one embodiment, these bids are managed using a centralized server and are periodically synced with the mobile device. In some embodiments, applications specify both slot/app specific bids as well as a generic bid or bid function for all other types of content requests.

In step 510, the method then returns the matching content or, if applicable, an error message if no content is found.

In one embodiment, the method may select the highest-ranking content from the sorted list and return the content. In some embodiments, the method may further filter the sorted list based on the preferences of an application including the slot (e.g., based on content type, bid preferences, etc.).

Figure 5B:
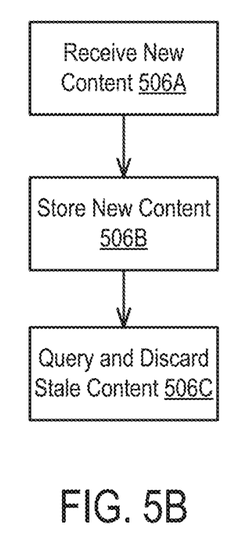
FIGS. 5B and 5C illustrate two embodiments for populating content for display by a local content exchange.
Figure 5C:
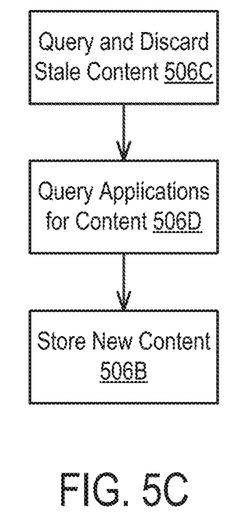

FIGS. 5B and 5C illustrate two embodiments for populating content for display by a local content exchange. Specifically, FIG. 5B illustrates a "push" mode of populating a local content exchange while FIG. 5C illustrates a "pull" mode of operating a local content exchange. In some embodiments, the methods in FIGS. 5B and 5C may be employed together or independently.

In step 506A, the method receives new content.

In one embodiment, as described in more detail in FIG. 6, mobile applications transmit content to the local content exchange implementing the method illustrated in FIG. 5B.

For example, the local exchange implements an application programming interface (API) whereby mobile applications can transmit content to the local content exchange. In this embodiment, the mobile application can be modified to intercept, for example, push notifications and convert these push notifications to content (as described in more detail herein).

As another example, the method can receive new content by actively monitoring a shared communication channel and intercepting content designated for applications. In this embodiment, the method may be implemented as part of the operating system and is configured to monitor a shared bus such as a notification channel. This monitoring can be performed by installing a callback or hook into the notification system.

In step 506B of the first embodiment, the method stores the new content. In one embodiment, the method stores the new content in a local content repository accessible by the method. For example, the method can store the content in a local relational database. In one embodiment, the method further timestamps the content before storing the content. Alternatively, or in conjunction with the foregoing, the method links the content to an existing campaign or applications (e.g., via relational foreign keys).

In step 506C, the method queries the content store and discards stale content.

In one embodiment, the method discards content containing a timestamp older than a predefined range (e.g., content older than one week). In other embodiments, the method discards content based on relational attributes of the content. For example, a given item of content can be associated with a campaign which has a defined start and end date. If the current date is after the end date, the method flushes the content repository of all content associated with that campaign.

FIG. 5C illustrates an alternative method for populating a content repository. In the illustrated embodiment, steps 506B and 506C are performed in a manner to that of the corresponding steps in FIG. 5B and the description of these steps are incorporated by reference. As illustrated, steps 506D and 506B in FIG. 5C may performed after step 506C in FIG. 5B. Alternatively, the method in FIG. 5C may be performed in lieu of the method in FIG. 5B.

The method first queries and discards stale content in step 506C.

In step 506D, the method queries methods for content. In one embodiment, a mobile application providing content to the method is configured with one or more callback functions that are triggered in response to defined events. These events include a request for content transmitted by the local content exchange. In response, the mobile applications identify content and return the content, transmitting it to the local content exchange.

Finally, in step 506B, the method stores the new content.

Although illustrated as a single process, the methods of FIGS. 5B and 5C can be implemented as an infinite loop, executing throughout the lifetime of the local content exchange.

FIG. 6 is a flow diagram illustrating a method for generating locally exchanged content from push notifications according to some embodiments of the disclosure. In the illustrated embodiment, a mobile application on a device with a local content exchange performs the method illustrated in FIG. 6.

In step 602, the method receives a notification.

In one embodiment, the notification comprises a push notification received by the method from a remote server. Alternatively, or in conjunction with the foregoing, the notification can comprise a local notification generated by a mobile application.

The form of the notification is not intended to be limited. In one embodiment, the notification format is defined by the relevant operating system. For example, the notification may comprise an iOS® or Android® notification and the format would in these scenarios correspond to a native notification. In some embodiments, the notifications can be custom to a given mobile application. In this scenario, a mobile application can define the format of notifications and receive notifications from any source. One example of this implementation is a mobile application communicating with a backend server, the backend server transmitting notifications to the mobile application.

Notifications can generally be local or remote notifications. Remote notifications are referred to interchangeably as "push" notifications. Local notifications comprise content generated by a mobile application. That is, the mobile application includes at least one function that constructs a notification and instructs the mobile device to display the notification. While notifications may be statically defined at compile time, they are often dynamically generated. That is, a local notification can be generated based on the state of the application. For example, a timer may be implemented as part of a news application and a local notification can be generated if the timer reaches a certain value (i.e., when the user has not logged into the app for a certain number of days). In some embodiments, local notifications can also be generated based on remote data. For instance, an application (while executing) may issue an HTTP request to a remote server and use the response as the body of the notification.

In contrast to local notifications, push notifications bypass the mobile application itself and are handled by the mobile operating system (in conjunction with a remote service). For push notifications, an application developer transmits a payload to a push notification service (PNS). The PNS authenticates the payload to verify the sender is indeed the owner of a mobile application and forwards the payload to one or mobile devices. The operating system on the mobile device receives the payload and subsequently displays the notification after building the user interface components of the notification with the payload.

As discussed above, the user interface representing a notification is separate from the actual data used to populate the message. Thus, the notification and its contents are strongly decoupled. This decoupling allows a mobile device to modified to make use of the notification in other ways such as the ways disclosed herein.

In step 604, the method re-formats a notification.

As described above, a notification generally comprises a serialized data format or a programmatically generated data structure. For push notifications, this serialized data format is represented as, for example, an HTTP payload:

```
{
  "pns": {
    "alert": {
      "title" : "Bob, New Loot Dropped!",
      "body" : "Check it out today, tap here."
    }
  }
}
```

Similarly, a local notification may be represented as constants in code or, more frequently, as programmatically generated data:

```
if (timer.expired?) {
    let content = NotificationContent( )
    content.title = "Come back!"
    content.body = "\(User.name), you have't
        logged in in \(timer.elapsedDays) days!"
    content.sound = NotificationSound.default( )
    NotificationCenter.display(content)
}
```

As illustrated above, both types of notifications may be personalized for a given user (e.g., "Bob" or "User.name").

Additionally, since the notifications are generated as needed, they can be highly temporal, targeted, and relevant to a user of the mobile device.

In contrast, content slots in mobile applications require a specifically formatted type of data. For example, a banner content slot may require a specifically sized image such as a 320×50 image. Generally, in existing systems a creative team creates these content files and stores them on a content server (e.g., an advertising server). When the slot is detected, an existing banner is chosen and transmitted to the mobile application for display.

To make use of existing notifications within content slots, the notifications must be reformatted into a format useable by the content slots. Thus, in step 604, the method converts the serialized data into a format useable by the slot. Various specific solutions of this step are described below.

In one embodiment, the method generates a fixed-size banner image matching the requesting application's content slot. As described in step 504, a content request may include details such as the type of slot. This may include dimensions and content type requirements (e.g., 320×50 image). The method uses this information to determine which translation to apply to the notification. In an image-based scenario, the method can generate the image in a variety of ways.

In one embodiment, the method stores a plurality of image templates matching the types of slots available. For example, for the slot illustrated in FIG. 3B, the template may include a "title" field ("Special Offer for John Smith"), an icon field, an application name field ("Food Dude"), and a button text field ("$15 off"). The image template comprises a set of instructions used to generate an image file. For example, a scalable vector graphic file with defined placeholders for inserting programmatically defined text/images. The SVG file can then be input into an image converter to convert the image to a raster graphics file (if needed).

In alternative embodiments, the method may generate a raster graphic automatically without the use of templates. For example, the method may use a BufferedImage object (in the Java® programming language) to dynamically build an image by positioning the text/image elements in a notification within a fixed-size image.

In one embodiment, the templates or graphic generating code may be implemented by the application receiving notifications. However, in alternative embodiments, the templates or graphic generating code may be implemented as part of the local content exchange. Finally, the templates or graphic generating code may also be implemented as part of the slot handling logic.

In one embodiment, the re-formatting can be done in advance. However, in other embodiments, the method may re-format the notifications in response to content requests. In this embodiment, the notification is stored in its original format. When a content request is received, the method identifies the type of slot included in the content request and, after identifying the responsive notification, re-formats the notification using the slot details.

In step 606, the method transmits the re-formatted notification details, a campaign ID, and a landing URL to the local content exchange. In one embodiment, step 606 may be performed entirely by a mobile application or, in other embodiments, by an operating system.

After generating the re-formatted notification, the method transmits details regarding this notification to a local content stage for storage (step 608). In this manner, the method may selectively choose which notifications to process and store for later retrieval (steps 610, 612). For instance, a notification may include a flag that indicate whether it should be utilized for content fulfillment (steps 610, 612). This flag allows a content creator to control how notifications are used.

In addition to the notification itself, the method transmits a campaign identifier and a landing URL to the local content exchange. In one embodiment, these may be extracted from a notification or generated by the application code itself. For example, when transmitting a push notification payload, the payload can include (as a custom key-value pair) the campaign identifier as well as the landing URL:

```
{
  "pns" : {
    "alert" : {
      "title" : "Bob, New Loot Dropped!",
      "body" : "Check it out today, tap here."
    }
  },
  "campaign_id": "12345",
  "landing_url": "app://offers"
}
```

As illustrated above, the landing URL can comprise an application-specific URL (i.e., a deep link). Alternatively, or in conjunction with the foregoing, the landing URL can comprise a traditional HTTP URL.

In one embodiment, the method transmits the entire reformatted notification in step 606. In this embodiment, steps 608 through 612 may be performed by the local content exchange. In other embodiments, the details transmitted in step 606 may only include metadata regarding the notification while the mobile application retains the underlying notification. In this embodiment, steps 608 through 612 are performed by the mobile application generating the notification.

In step 608, the method caches the notification.

In one embodiment, a local content exchange caches metadata regarding the notification such as the application identifier, the time the notification was generated, and other notification-specific details. In some embodiments, the local content exchange may further store the reformatted notification generated in step 604. In other embodiments, the application generating the notification may store the reformatted notification.

In step 610, the method receives a content request.

As described above, a content request is generated by another mobile application that displays a content slot during execution of the application. Details regarding the transmission and contents of the content request are not repeated herein but are incorporated by reference in their entirety.

In step 612, the method selects content to fulfill the content request and transmits the content.

In the embodiment where content is cached by the local content exchange, steps 610 and 612 may be performed similarly to steps 506-510 in FIG. 5A and the details of those steps are incorporated herein by reference.

In the embodiment where content is cached by mobile applications themselves, step 610 may comprise receiving a forwarded content request from the local content exchange at the mobile application caching the reformatted notification. In response to this request, the mobile application selects a reformatted notification and transmits it to the local content exchange which processes the content as described in FIGS. 5A through 5C.

Figure 7:
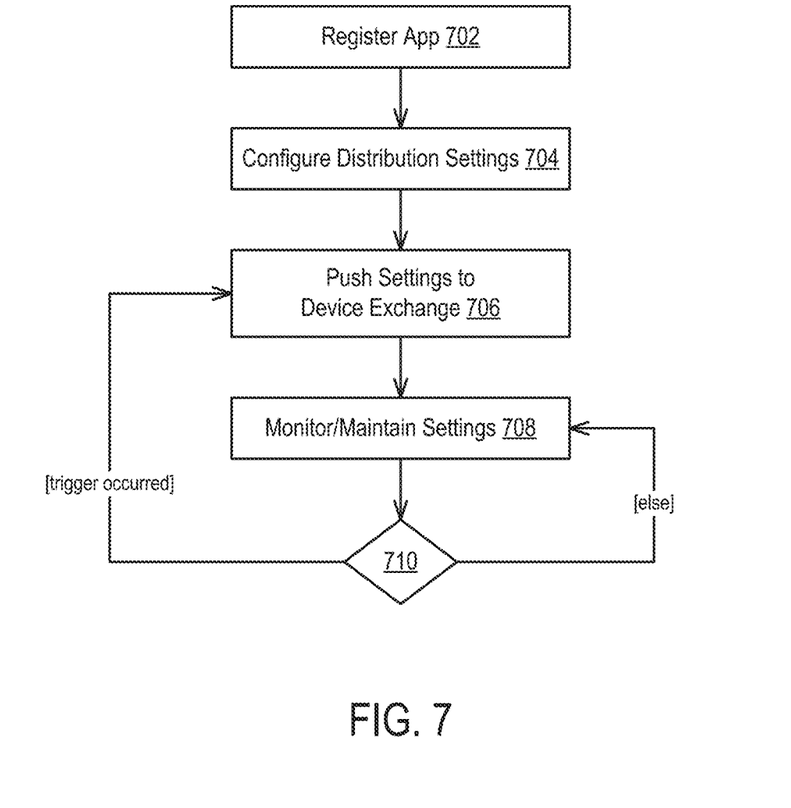
FIG. 7 illustrates a method for synchronizing content settings between a remote server and a local content exchange.

FIG. 7 illustrates a method for synchronizing content settings between a remote server and a local content exchange.

In step 702, the method registers an application.

In this step, developers of applications authenticate their applications with the method. This allows application owners to manage the settings for one or more applications deployed on user devices. Various authentication strategies may be used and the disclosure is not limited to a particular method of authenticating. As part of step 702, the method stores an identifier of a developer and an identifier for each application associated with the developer.

In step 704, the method configured distribution settings.

In one embodiment, the method provides a web-based or app-based interface allowing users to define how content should be distributed from their applications. Specifically, an app developer defines how notifications for registers applications should be handled by the local content exchange. For example, the app developer can specify a key used to determine whether a notification should be reformatted (as described above).

The distribution settings may also include temporal campaign settings. For example, the method may allow a developer to create a campaign identifier which the developer may then insert into notifications to associate a notification with a campaign. Finally, the distribution settings may include bidding preferences (e.g., eCPMs, budgets, target spending, etc.), competitive separation settings, frequency capping settings, and other types of content exchange settings.

In step 706, the method pushes the settings to the local device exchanges.

In the illustrated embodiment, step 706 is executed for each mobile device implementing the device exchange. In one embodiment, the mobile device periodically transmits a listing of application identifiers of applications installed on the mobile device, and the method extracts the distribution settings associated with these applications. The method then transmits the aforementioned distribution settings down to the mobile device. In some embodiments, this synchronization may be performed at regularly scheduled intervals.

In step 708, the method monitors and maintains the settings of the server. This may entail recording event data (i.e., reporting data) generated by local content exchanges during a campaign. Generally, step 708 comprises a wait stage until a specific trigger occurs which requires a re-synchronization.

In step 710, the method detects that this trigger has occurred and if so re-executes steps 706-708. If the trigger has not occurred, the method continues to monitor and maintain settings in step 708.

In one embodiment, a trigger comprises a change in settings that requires a re-synchronization. For example, an application campaign may expire or be terminated prematurely, which would require that local content exchange be synchronized to prevent content associated with that campaign being displayed in slots. Other triggers include new application registrations or de-registrations in step 702. Further, a change in a user's installed applications may trigger the process.

In the illustrated embodiment, the triggers may result in all application identifiers being re-synchronized. In other embodiments, the trigger may result in patches being synchronized. For example, when a user installs a new app, the process may be triggered to retrieve settings only for that application (and not the remaining apps).

Figure 8:
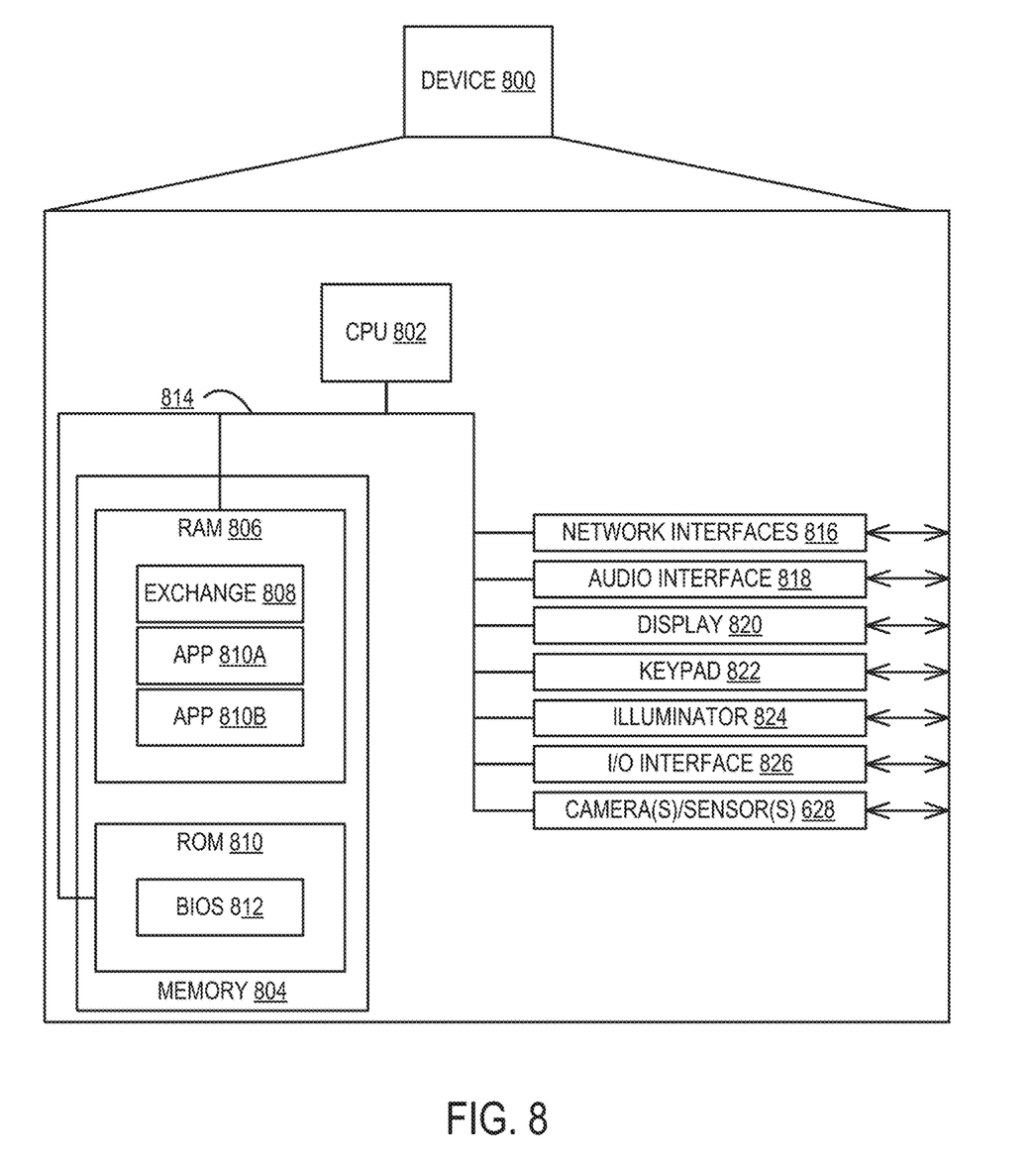
FIG. 8 is a block diagram illustrating a processing device for implementing a local content exchange according to some embodiments of the disclosure.

FIG. 8 is a block diagram illustrating a processing device for implementing a local content exchange according to some embodiments of the disclosure.

Processing device can include many more or fewer components than those shown in FIG. 8. For example, the aforementioned instances may not require an audio interface, display, keypad, illuminator, or cameras/sensors. However, the components shown are sufficient to disclose an illustrative embodiment for implementing the present disclosure. Further, in some embodiments, the device illustrated in FIG. 8 can be implemented as a virtual machine while in other embodiments the device can be implemented as a physical machine. In some embodiments, the device is implemented as both, with a virtual machine running on the device depicted in FIG. 8.

As shown in FIG. 8, device (800) includes processing units (CPUs) (802) in communication with a mass memory (804) via a bus (814). Device (800) also includes one or more network interfaces (816), an audio interface (818), a display (820), a keypad (822), an illuminator (824), an input/output interface (826), and a camera(s) or other optical, thermal or electromagnetic sensors (828). Device (800) can include one camera/sensor (828), or a plurality of cameras/sensors (828), as understood by those of skill in the art.

Device (800) can optionally communicate with a base station (not shown), or directly with another computing device. Network interface (816) includes circuitry for coupling device (800) to one or more networks and is constructed for use with one or more communication protocols and technologies. Network interface (816) is sometimes known as a transceiver, transceiving device, or network interface card (NIC).

Audio interface (818) is arranged to produce and receive audio signals such as the sound of a human voice. For example, audio interface (818) can be coupled to a speaker and microphone (not shown) to enable telecommunication with others and generate an audio acknowledgment for some action. Display (820) can be a liquid crystal display (LCD), gas plasma, light emitting diode (LED), or any other type of display used with a computing device. Display (820) can also include a touch sensitive screen arranged to receive input from an object such as a stylus or a digit from a human hand.

Keypad (822) can comprise any input device arranged to receive input from a user. For example, keypad (822) can include a push button numeric dial, or a keyboard. Keypad (822) can also include command buttons that are associated with selecting and sending images. Illuminator (824) can provide a status indication and provide light. Illuminator (824) can remain active for specific periods of time or in response to events. For example, when illuminator (824) is active, it can backlight the buttons on keypad (822) and stay on while the device (800) is powered. Also, illuminator (824) can backlight these buttons in various patterns when actions are performed, such as dialing another processing device. Illuminator (824) can also cause light sources positioned within a transparent or translucent case of the device (800) to illuminate in response to actions.

Device (800) also comprises input/output interface (826) for communicating with external devices not shown in FIG. 8. Input/output interface (826) can utilize one or more communication technologies, such as USB, infrared, Bluetooth™, or the like.

Mass memory (804) includes a RAM (806), a ROM (810), and other storage means. Mass memory (804) illustrates another example of computer storage media for storage of information such as computer-readable instructions, data structures, program modules or other data. Mass memory (804) stores a basic input/output system ("BIOS") (812) for controlling low-level operation of processing device (800). The mass memory can also store an operating system for controlling the operation of processing device (800). It will be appreciated that this component can include a general-purpose operating system such as a version of UNIX, or LINUX™, or a specialized client communication operating system such as Windows Client™, or the Symbian® operating system. The operating system can include, or interface with a Java virtual machine module that enables control of hardware components and operating system operations via Java application programs.

Memory (804) includes a local content exchange (808). As described above, exchange (808) facilitates the managed exchange of content between apps (810A, 810B). In the illustrated embodiment, the exchange and apps performs the methods described more fully in the description of FIGS. 3A-3D, 4, 5A-5C, and 6, the disclosure of which is incorporated herein by reference in its entirety.

These computer program instructions can be provided to a processor of: a general purpose computer to alter its function to a special purpose; a special purpose computer; ASIC; or other programmable digital data processing apparatus, such that the instructions, which execute via the processor of the computer or other programmable data processing apparatus, implement the functions/acts specified in the block diagrams or operational block or blocks, thereby transforming their functionality in accordance with embodiments herein.

For the purposes of this disclosure a non-transitory computer readable medium (or computer-readable storage medium/media) stores computer data, which data can include computer program code (or computer-executable instructions) that is executable in machine readable form. By way of non-limiting example a computer readable medium can comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information. Computer readable storage media includes, but is not limited to, RAM, ROM, EPROM, EEPROM, flash memory or other solid-state memory technology, optical storage, cloud storage, magnetic storage devices, or any other physical or material medium which can be used to tangibly store the desired information or data or instructions and which can be accessed by a computer or processor.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module can be stored on a computer readable medium for execution by a processor. Modules can be integral to one or more computing devices, client devices, servers, or be loaded and executed by one or more of such devices. One or more modules can be grouped into an engine or an application.

Those skilled in the art will recognize that the disclosed methods and systems can be implemented in many manners and are not limited by the foregoing exemplary embodiments and examples. Functional elements being performed by single or multiple components, in various combinations of hardware and software or firmware, and individual functions, can be distributed at the client, server or cloud level, or at all levels. In this regard, any of the features described herein can be combined into single or multiple embodiments, and alternate embodiments having fewer than, or more than, all the features described herein are possible.

The embodiments of methods presented and described as flowcharts in this disclosure are provided by way of example to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

Functionality can also be, in whole or in part, distributed among multiple components, in manners now known or to become known. Thus, myriad software/hardware/firmware combinations are possible in achieving the functions, features, interfaces and preferences described herein. The scope of the present disclosure covers known manners for carrying out the described unconventional features and functions and interfaces, as well as those variations and modifications that can be made to the hardware or software or firmware components described herein as would be understood by those skilled in the art now and hereafter. Thus, while various embodiments have been described for purposes of this disclosure, such embodiments should not be deemed to limit the teaching of this disclosure to those embodiments. Various changes and modifications can be made to the elements and operations described herein to obtain a result that remains within the scope of the systems and processes described in this disclosure

What is claimed is:

1. A method comprising:
   receiving, at a content exchange executing on a mobile device, a request for content from a mobile application, the request including an identification of an area for display in the mobile application;
   identifying, by the content exchange, a notification for the request for content by retrieving the notification from a database associated with the mobile device, the notification comprising a push notification received by another mobile application installed on the mobile device, the identification of the notification comprising intercepting the notification from the other mobile application and caching the notification in the database;
   reformatting, by the content exchange, the notification into another type of file that is a responsive content item based on the identification of the area for display in the request for content, the reformatting comprising converting serialized data associated with the notification from a format associated with the other mobile application into a format useable by the mobile application, such that the responsive content item is configured to fit into the area for display in the mobile application, the configuration comprising dynamically building the responsive content item by positioning information within the notification in a fixed-sized manner within the responsive content item, the responsive content item being in the useable format; and
   sending, by the content exchange, the responsive content item to the mobile application in response to the request.

2. The method of claim 1, the receiving a request for content comprising receiving a request to insert content into a predefined slot in response to detecting that the predefined slot is presented on a screen of the mobile device executing the mobile application.

3. The method of claim 1, the reformatting comprising:
   extracting, by the content exchange, a payload from the notification;
   selecting, by the content exchange, a template based on slot parameters included in the request for content; and
   inserting, by the content exchange, data from the payload into the template.

4. The method of claim 1, the identifying the notification for the request for content comprising issuing a request one or more other mobile applications stored on the mobile device, the request causing the one or more mobile applications to transmit notifications to the content exchange.

5. The method of claim 1, further comprising:
   recording, by the content exchange, user engagement data with the notification; and
   periodically syncing, by the content exchange, the user engagement data with a remote server.

6. A non-transitory computer-readable storage medium for tangibly storing computer program instructions capable of being executed by a computer processor, the computer program instructions defining steps of:
   receiving, at a content exchange executing on a mobile device, a request for content from a mobile application, the request including an identification of an area for display in the mobile application;
   identifying, by the content exchange, a notification for the request for content by retrieving the notification from a database associated with the mobile device, the notification comprising a push notification received by another mobile application installed on the mobile device, the identification of the notification comprising intercepting the notification from the other mobile application and caching the notification in the database;
   reformatting, by the content exchange, the notification into another type of file that is a responsive content item based on the identification of the area for display in the request for content, the reformatting comprising converting serialized data associated with the notification from a format associated with the other mobile application into a format useable by the mobile application, such that the responsive content item is configured to fit into the area for display in the mobile application, the configuration comprising dynamically building the responsive content item by positioning information within the notification in a fixed-sized manner within the responsive content item, the responsive content item being in the useable format; and
   sending, by the content exchange, the responsive content item to the mobile application in response to the request.

7. The non-transitory computer-readable storage medium of claim 6, the receiving a request for content comprising receiving a request to insert content into a predefined slot in response to detecting that the predefined slot is presented on a screen of the mobile device executing the mobile application.

8. The non-transitory computer-readable storage medium of claim 6, the reformatting comprising:
   extracting, by the content exchange, a payload from the notification;
   selecting, by the content exchange, a template based on slot parameters included in the request for content; and
   inserting, by the content exchange, data from the payload into the template.

9. The non-transitory computer-readable storage medium of claim 6, the identifying the notification for the request for content comprising issuing a request one or more other mobile applications stored on the mobile device, the request causing the one or more mobile applications to transmit notifications to the content exchange.

10. The non-transitory computer-readable storage medium of claim 6, the steps further comprising:
recording, by the content exchange, user engagement data with the notification; and
periodically syncing, by the content exchange, the user engagement data with a remote server.

11. A device comprising:
a processor configured to:
receive, at a content exchange executing on a mobile device, a request for content from a mobile application, the request including an identification of an area for display in the mobile application;
identify, by the content exchange, a notification for the request for content by retrieving the notification from a database associated with the mobile device, the notification comprising a push notification received by another mobile application installed on the mobile device, the identification of the notification comprising intercepting the notification from the other mobile application and caching the notification in the database;
reformat, by the content exchange, the notification into another type of file that is a responsive content item based on the identification of the area for display in the request for content, the reformatting comprising converting serialized data associated with the notification from a format associated with the other mobile application into a format useable by the mobile application, such that the responsive content item is configured to fit into the area for display in the mobile application, the configuration comprising dynamically building the responsive content item by positioning information within the notification in a fixed-sized manner within the responsive content item, the responsive content item being in the useable format; and
send, by the content exchange, the responsive content item to the mobile application in response to the request.

12. The device of claim 11, the receiving a request for content comprising receiving a request to insert content into a predefined slot in response to detecting that the predefined slot is presented on a screen of the mobile device executing the mobile application.

13. The device of claim 11, the reformatting comprising:
extracting, by the content exchange, a payload from the notification;
selecting, by the content exchange, a template based on slot parameters included in the request for content; and
inserting, by the content exchange, data from the payload into the template.

14. The device of claim 11, the identifying the notification for the request for content comprising issuing a request one or more other mobile applications stored on the mobile device, the request causing the one or more mobile applications to transmit notifications to the content exchange.

* * * * *